March 3, 1970 — B. FUTTERER — 3,498,891
METHOD OF MAKING SHEARING FOILS FOR DRY SHAVERS
Original Filed Dec. 17, 1965

BODO FÜTTERER
*INVENTOR.*

BY *Arthur Schwartz*

*Attorney*

United States Patent Office 3,498,891
Patented Mar. 3, 1970

3,498,891
METHOD OF MAKING SHEARING FOILS FOR DRY SHAVERS
Bodo Futterer, Sarnen, Switzerland, assignor to The Gillette Company, Boston, Mass., a corporation of Delaware
Original application Dec. 17, 1965, Ser. No. 524,661, now Patent No. 3,409,984. Divided and this application July 31, 1968, Ser. No. 749,082
Int. Cl. C23b 7/00, 5/50
U.S. Cl. 204—11                                10 Claims

ABSTRACT OF THE DISCLOSURE

A method of making a shearing foil for dry shavers including the steps of galvanically depositing a layer of a relatively soft metal on the surface of a conductive matrix provided with an array of non-conductive portions, the latter defining the locations of perforations left in the soft metal layer, and depositing a substantially thinner coating of relatively hard material on the exposed surface of said layer including the walls of the perforations, the coating extending to the bottoms of said perforations.

CROSS REFERENCE

This application is a division of Ser. No. 524, 661, filed Dec. 17, 1965, now Patent. No. 3,409,984.

OBJECTS AND BACKGROUND

My present invention relates to shearing foils, i.e. to contoured and/or apertured protective foils as used in cooperation with one or more underlying blades whose teeth are separated by spaces registering with the perforations of the foil.

Shearing foils are employed in many types of dry shavers. The thinner such foils can be made, the closed are the shaves they afford.

In the production of thin, hard foils, capable of assuming an unlimited variety of hole patterns, galvanoplastic manufacturing processes have come increasingly into use in lieu of prior methods employing stamped and hardened sheet steel. However, a galvanically produced deposit inherently combines a high degree of hardness with marked brittleness and consequently its hardness has to be reduced in order to minimize any risk of fracture. Moreover, conventionally electroformed shearing foils do not retain their sharp edges as long as do steel foils.

Accordingly, it is an important object of this invention to provide an improved shearing foil combining a high degree of hardness along its cutting edges with good elasticity, so as to be substantially fracture-proof, as well as a relatively simple process for making such foils.

Another object of my invention is to provide a shearing foil of this description whose edges are practically self-sharpening.

SUMMARY

These objects are realized, in accordance with my invention, by providing on one surface of a supporting metal foil, having a chosen array of gaps or perforations, a coating of greater hardness which extends into the perforations and covers the peripheral walls thereof. The other surface of the foil, i.e. the one which is to contact the blade upon assembly in a shaver, is not coated with the hard material. Such shearing foils exhibit abrasion-resistant cutting edges along the rims of the perforations where the hard coating meets the exposed surface of the softer substrate. In use, this substrate is eroded faster than the coating so as to form an acute rake angle along each cutting edge. As a further result of this erosion, the friction between the shearing foil and the cutter blade is greatly reduced. Consequently, upon continued use there will occur but little further wear on the foil surface contacting the blade, with consequent preservation of the shape of the hard cutting edges.

According to another aspect of my invention, a shearing foil of the character described is produced by depositing a relatively soft layer of metal on a conductive matrix having a chosen array of perforation-defining portions masked with an insulating substance to prevent a deposition of the metal thereon. A coating of a relatively hard material is then applied to the exposed surface of the electroformed layer, either electrolytically or by some other method of deposition, so as to extend to the very bottom of the peripheral walls of the perforations which are formed in the supporting layer at the locations of the nonconductive zones.

BRIEF DESCRIPTION OF THE DRAWINGS

For a better understanding of the invention, reference is had to the following description taken in conjunction with the accompanying drawing in which.

DETAILED DESCRIPTION

Figure 1:
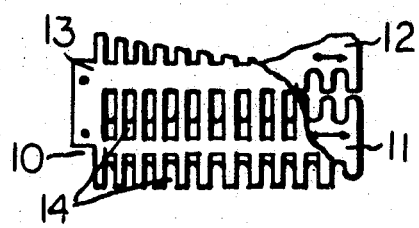
FIG. 1 is a plan view of part of a shaving-head assembly including a shearing foil embodying the invention.

FIG. 1 shows part of a shaving head 10, as used in conventional electric shavers, wherein a set of laterally oscillatable blades 11, 12 are overlain by a protective foil 13 whose slot-like perforations 14 register with the inter-teeth gaps 15 of the blades.

Figure 2:
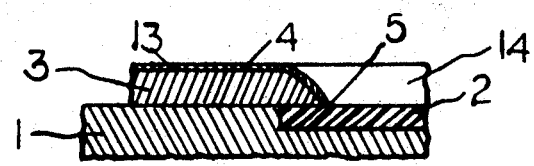
FIG. 2 is a cross-sectional view of an arrangement for making the shearing foil of FIG. 1.

In FIG. 2 there is shown a conductive matrix or die 1 with surface recesses occupied by an insulating layer 2, the distribution of insulation 2 corresponding to the pattern of perforations 14 in FIG. 1. Upon die 1 there is galvanically deposited a layer 3 of a metal, preferably nickel, which for reasons of elasticity should have a relatively low hardness of, say, 400° Vickers. Because of the three-dimensional growth of the galvanic deposit, the voids formed therein are somewhat narrower than the corresponding recesses in matrix 1 so that the electroformed body 3 extends partly, with a convex curvature, over insulating layer 2. A thin, hard coating 4 is then deposited on layer 3 to define a sharp edge 5 at the bottom of each perforation 14. Layers 3 and 4, differing in hardness, may be both cathodically formed either from the same or from different metals. Where both layers are made from the same metal, the harder layer 4 may be produced by varying the conditions of electrodeposition, e.g. by increasing the current density.

Thus, covering layer 4 may consist of a metal such as chromium, rhodium, or hard nickel. This coating may also be produced from non-metallic materials such as ceramic or vitreous substances, and particularly in this instance may be deposited on substrate 3, in the form of a hardenable fluid layer, by brushing, spraying or similar techniques.

Figure 3:
FIG. 3 is a cross-sectional view of a portion of the freshly made shearing foil.

FIG. 3 shows the finished foil 13 immediately after it has been removed from the die, illustrating its internally coated perforations 14 which converge toward the uncoated underside of substrate 3.

Figure 4:
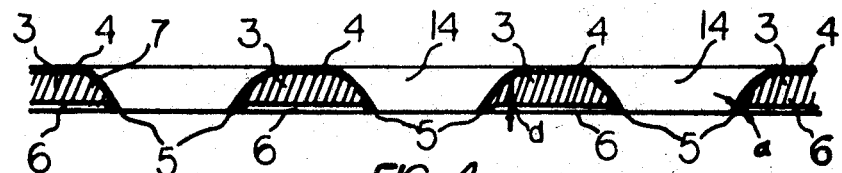
FIG. 4 is a view similar to FIG. 3, showing the foil after an initial period of use.

FIG. 4, in a similar cross-sectional view, shows the partial erosion of the exposed underside of the shearing foil by the co-operating blade or blades during its initial use. Thus, the undersurface of the substrate 3 wears to a greater degree than its cutting edges 5, formed by the harder coating so that concavities 6 come into existence along this surface. The depth of these concavities has been indicated at $d$. As a consequence of this phenomenon, the friction between the shearing foil and the cutter blade is reduced whereby the foil becomes less subject to stresses; at the same time its hard cutting edges 5 are effectively sharpened to exhibit an acute angle $\alpha$. The hard coating is also subject to relatively little strain, e.g. upon a flexing of the foil, by virtue of the rounding of the outer edges 7 of the perforations 14 which converge toward the cutting edges 5.

While there has been described what is, at present, considered to be a preferred embodiment, it will be obvious to those skilled in the art that various modifications may be made therein without departing from the spirit and scope of my invention as defined in the appended claims.

I claim:
1. A method for making a shearing foil for a dry shaver, comprising the steps of:
 (a) providing a conductive matrix die having thereon an array of nonconductive portions, said nonconductive portions comprising a series of surface recesses occupied by insulating material,
 (b) depositing galvanically a first layer of a relatively soft metal upon said conductive matrix die thereby defining perforations with walls in said deposit layer,
 (c) depositing thereafter a second, substantially thinner layer of a relatively hard material on the entire exposed surface area of said first deposit layer including said walls in said first deposit layer, and
 (d) stripping off a foil comprising the combined first and second layers from the surface of said matrix die.

2. A method as defined in claim 1 in which said second layer is metallic and is deposited galvanically.

3. A method as defined in claim 1 in which said second layer is of the same metal as said first layer and is deposited from the same galvanic bath under different operating conditions.

4. A method as defined in claim 1 in which said second layer and said first layer are of different metals.

5. A method as defined in claim 1 wherein the galvanic deposition of said first layer is such that the three-dimensional growth of the deposit layer causes partial extension of said deposit layer over onto said insulation material.

6. A method as defined in claim 2 wherein said second layer is a metal selected from the group consisting of chromium, rhodium and nickel.

7. A method as defined in claim 1 wherein said second layer is of a non-metallic material.

8. A method as defined in claim 3 wherein said second layer is applied by brushing said non-metallic material onto said first layer.

9. A method as defined in claim 7 wherein said second layer is applied by spraying said non-metallic material onto said first layer.

10. A method as defined in claim 7 wherein said non-metallic material is of ceramic.

References Cited

UNITED STATES PATENTS

| | | | |
|---|---|---|---|
| 2,166,366 | 7/1939 | Norris | 204—11 |
| 2,225,734 | 12/1940 | Beebe | 204—11 |
| 3,064,349 | 11/1962 | Futterer et al. | 30—346.53 |

FOREIGN PATENTS 1,160,258  12/1963  Germany.

JOHN H. MACK, Primary Examiner

T. TUFARIELLO, Assistant Examiner

U.S. Cl. X.R.

204—24